Mar. 13, 1923. 1,448,350.
P. M. DE C. IRELAND.
TROLLEY POLE SAFETY APPLIANCE FOR ELECTRIC TRAMS AND THE LIKE.
FILED APR. 9, 1921. 4 SHEETS—SHEET 1.
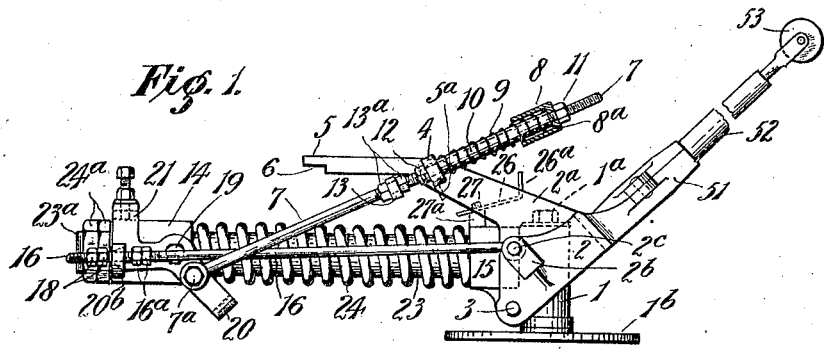
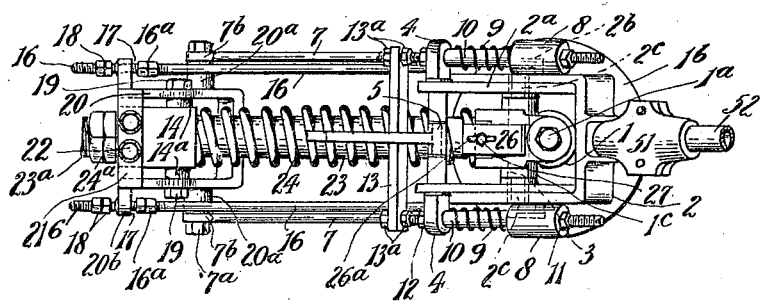
Inventor:
Percy Markham DeCourcy Ireland
Williams, Bradbury,
See, & McCabe
Attys.

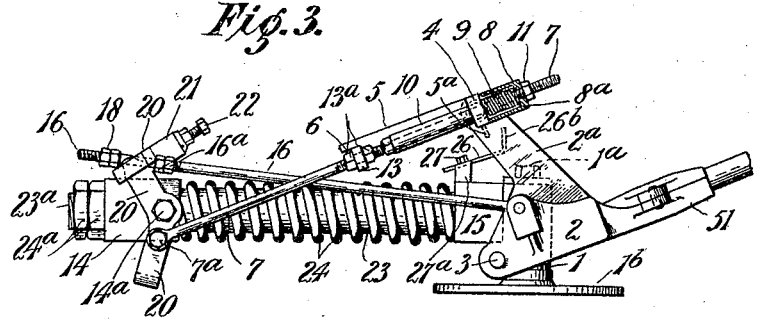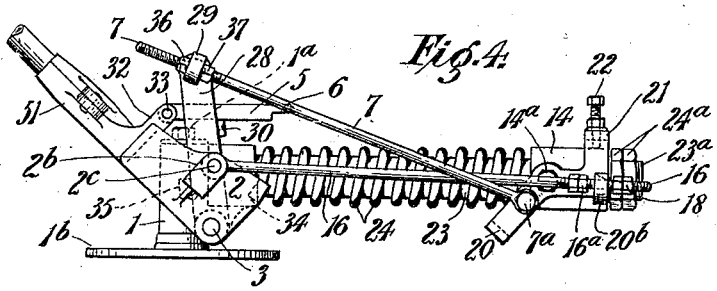

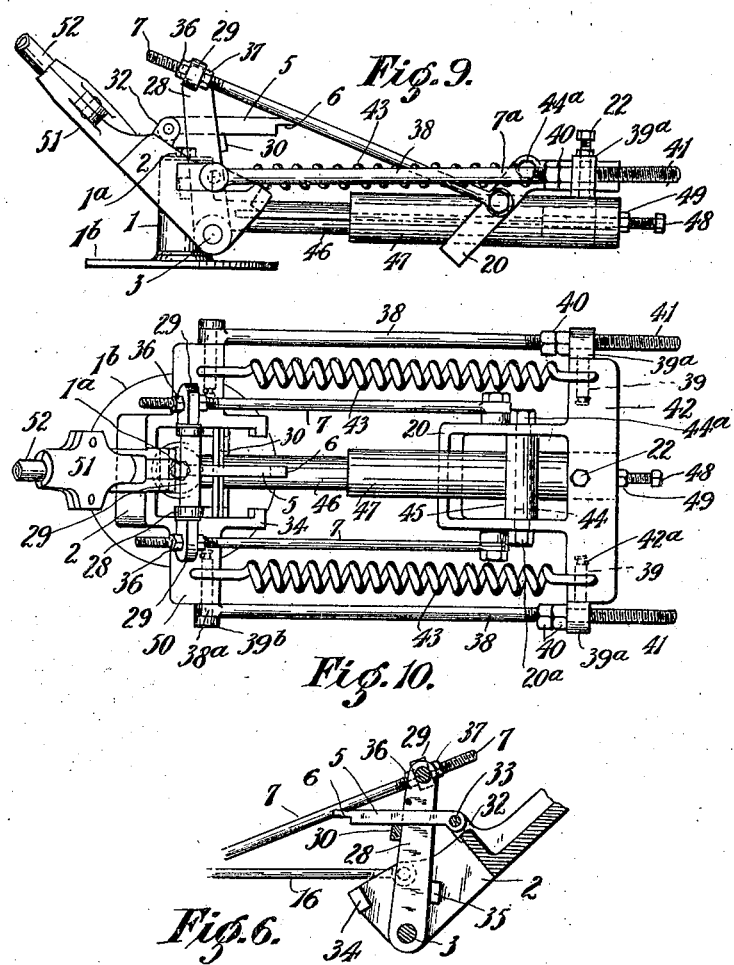

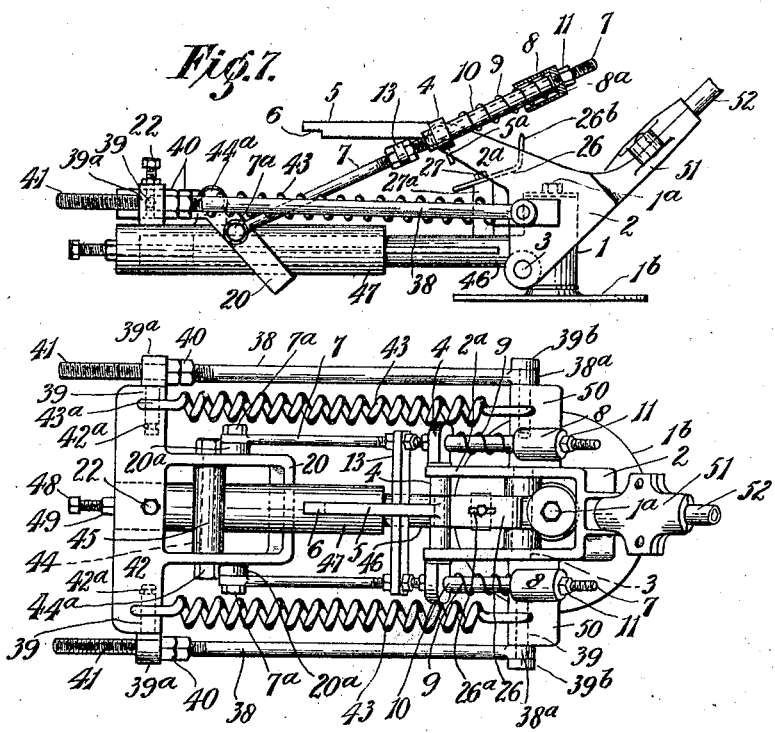

Patented Mar. 13, 1923.

1,448,350

UNITED STATES PATENT OFFICE.

PERCY MARKHAM DE COURCY IRELAND, OF HEIDELBERG, VICTORIA, AUSTRALIA.

TROLLEY-POLE SAFETY APPLIANCE FOR ELECTRIC TRAMS AND THE LIKE.

Application filed April 9, 1921. Serial No. 459,946.

*To all whom it may concern:*

Be it known that I, PERCY MARKHAM DE COURCY IRELAND, a British subject, residing at "Amberley," Plenty Road, Heidelberg, in the State of Victoria, Commonwealth of Australia, have invented new and useful Trolley-Pole Safety Appliances for Electric Trams and the like, of which the following is a specification.

This invention relates to a trolley pole safety appliance for electric trams and the like and which is designed to prevent the spring controlled trolley pole from continuing to be kept in an upright or in such a position that it will foul the overhead wire system, after the trolley wheel has accidentally broken away or become disengaged from the trolley wire.

The construction of the appliance is such that when the trolley wheel leaves its overhead wire, means are provided which enable the trolley pole and an oscillating pivoted frame to which it is connected, to automatically free itself from the action or influence of a coiled spring or springs by the rotation or release of a rocking frame and thus the pole descends beneath the trolley wire where it is in a position to be conveniently lowered by the conductor or person in charge.

The pole is then lowered to a horizontal position in order to re-set the rocking frame and to bring the pole again under the influence of the coiled spring or springs, to enable the trolley wheel to engage the trolley wire.

Referring to the accompanying drawings wherein like reference numerals and letters denote corresponding parts in the specification—

Fig. 1 is a side elevation of the preferred form of the appliance and

Fig. 2 represents a plan of Fig. 1.

Fig. 3 shows the appliance of Fig. 1 in elevation when the trolley pole is being pulled down to re-set the rocking frame.

Figs. 4 and 5 are elevation and plan views respectively of a modified form of the appliance, and Fig. 6 is a part sectional view of the modified form of the appliance.

Figs. 7 and 8 illustrate in plan an alternative form of the appliance wherein tension springs are employed, and Figs. 9 and 10 represent in elevation and plan a modified form of the appliance employing tension springs.

In the construction shown in Figs. 1, 2 and 3 of the accompanying drawings, the numeral 1 represents a cylindrical member adapted to rotate about its vertical axis or fixed pin $1^a$ and formed with either a rectangular or circular base or bed plate $1^b$ which is bolted to the roof of the car or vehicle.

The rotatable member 1 supports an oscillating trolley pole frame 2, the side cheeks of which receive the ends of a spindle 3 working in integral transverse bearings $1^c$ of the member 1, the frame 2 thus being able to oscillate or swing forwards and rearwards about each side of the member 1. A rigidly mounted cross shaft may be employed instead of the rotatable spindle 3, in which case the pole frame would be loosely mounted on said shaft and free to rotate about same. The pole frame is provided with the usual cover and socket plates 51 which when bolted together support the lower end of the trolley pole 52 which carries the trolley wheel 53 to engage the overhead trolley wire (not shown).

The member 1 is cast with a socket 15 which supports the rear end of a horizontally projecting guide rod 23 receiving a concentrically mounted coiled spring 24 and a slidably mounted collar or sleeve 14 which is adapted to strike or bear against nuts $24^a$ mounted on the screw threaded front portion $23^a$ of the said rod by the recoil of the guide rod spring when the trolley wheel breaks away from the overhead wire.

The side cheeks of the said frame 2 are each cast with an outer holed lug or L-shaped bearing $2^b$ for the reception of cross pins $2^c$ each of which pass into the cheeks of the pole frame and pivotally support the rear apertured ends of a pair of draw bars 16. The front threaded portions of the draw bars are slidably supported in the bearings or side lugs $20^b$ formed integral with the arms of a U-shaped rocking frame 20 and are threaded to receive two pairs of nuts 16ª and 18 respectively, the rear pair 16ª being positioned some little distance at the back of the bearing 20ᵇ leaving a space or clearance 17.

The rocking or releasing frame 20 consists of a U-shaped member formed with two arms and having an integral bridging piece 21 which straddles the spring guide sleeve 14. The bridging piece 21 is holed to take two vertical adjustable screws 22 which are adapted to limit the forward movement of the rocking frame by bearing on the upper surface of the sleeve 14. In order that it can pivot about its axis the side arms of the frame are holed to receive pins 19 which are screwed into integral lugs 14ª of the slidable sleeve 14.

The side cheeks of the oscillating frame 2 project upwardly and obliquely forming two integral extension arms 2ª, the upper extremities of the latter being apertured for the reception of a transverse slidably mounted member or cross bar 4 provided with outer eyes to form guides for two longitudinally disposed levers 7, the lower ends of which latter terminate in hollow bosses or eyes 7ᵇ to receive threaded bolts or pins 7ª which take into two internally threaded side lugs 20ª of the rocking frame 20.

The levers 7 are also connected by a bridging strap or bar 13 of rectangular cross section and which is rigidly secured to the levers by nuts 13ª.

A T-piece 5 is pivotally and centrally mounted on the member 4 its free end having a portion of its under surface cut away to leave a vertical face or stop 6 which is adapted to be engaged by the cross bar 13.

The said T-piece 5 also has a depending stop 5ª which is adapted to contact against the vertical face 26ᵇ of a slotted L-shaped catch or plate 26, when the pole frame and cross piece oscillate rearwards. The slot 26ª is formed in the plate to receive a set screw 27 which takes into an internally threaded vertical lug 27ª cast integral with the guide rod socket 15. By these means the L-plate can be slidably adjusted at any desired position relatively to the slidable member 4.

Each upper or rear half of the levers 7 is threaded and takes a nut 12 which is positioned flush up against the front face of the member 4 so that when the trolley wheel 53 leaves the trolley wire the nut limits the forward movement of said member 4. The threaded portion of the lever 7 also receives another nut 11 positioned directly up against the rear apertured base 8ª of a tubular casing or sleeve 8 to hold or retain one end of a sleeve 10, the other end of the latter bearing against the rear face of the nut 12.

The sleeve 10 takes a coiled spring 9 which is adapted when compressed to its fullest extent to recede within and be suitably housed in the tubular casing as shown in Fig. 3.

When the trolley wheel 53 is in engagement with the trolley wire and the appliance is in its normal working condition the pole 52 is kept at a tension by the influence of the recoiling spring 24, the disposition of the parts when in such position being shown in Figs. 1 and 2.

If the trolley wheel, accidentally or otherwise, breaks away from the trolley wire, the trolley pole 52 is jerked upwards with considerable force, and the frame 2 swings or oscillates forward causing the member 4, through the medium of the nuts 12, to communicate the motion of the pole frame to the levers 7 which are thrust downwards and bearing on the arms of the U-shaped rocking frame 20 tilt or rock the latter about its pivot pins 19 into an approximately vertical position thus temporarily disconnecting the draw bars, levers, the pole and its frame from the influence of the spring 24.

After the forward rotation of the rocking frame 20, the pole frame 2 swings back until the arms 2ª assume an approximately vertical position, governed by the gradual compression of the springs 9 and further back until the stop 6 of the pivoted T-piece 5 engages the bridging strap 13 and thus the pole which has fallen beneath the trolley wire is steadied or prevented from vibrating.

The pole can now be conveniently pulled down to a horizontal position in order to reset the rocking frame 20 and so bring the slidable guide rod sleeve 14, the tilting levers 7, the draw bars 16 and the pole frame 2 under the influence of the spring 24 to give the necessary tension to the pole and enable its trolley wheel 53 to re-engage the trolley wire.

The pole 52 is provided with the usual pull cord (not shown) and which, when drawn down, lowers the pole to a horizontal position during which operation the front and lower ends of the draw bars and levers describe arcs bearing on the upper and lower portions respectively of the rocking frame, and rotate same counter clockwise until it assumes a horizontal position.

On releasing the cord the recoiling action of the spring 24 forces the sleeve 14 towards the guide rod nuts 24ª and the pole frame 2 swings forward to its normal and working position, the stop 26ᵇ when the pole is in a horizontal position, having contacted with the depending stop 5ª tilts or raises the T-piece 5, and its stop 6 is thus disengaged from the bridging strap 13 enabling the trolley wheel to again engage the overhead wire.

When the trolley wire is engaged by the trolley wheel the rocking frame cannot accidentally pivot forwards or be released from the influence of the spring 24 as the axis of the rocking frame pivot pin 19 is positioned above the axis or middle point of the bearing 20$^b$ and hence the rocking frame owing to the arrangement of the pivot points mentioned is subjected at 20$^b$ to a force which tends to rotate it counter clockwise and prevents it from becoming released from the influence of the spring, and which force is only overcome and the rocking frame rotated in the opposite direction when the levers 7 are thrust forward.

In a modified form of the appliance as illustrated in Figs. 4, 5 and 6, two arms or uprights 28 are employed in lieu of the pole frame extensions 2$^a$, the arms 28 being loosely mounted on the shaft 3 which also support the side cheeks of the pole frame 2. 29 is a cross bar which passes through the upper eyes of and is supported by the arms 28 and has end holes for the reception of the levers 7 which are held rigidly to same by nuts 36 and 37, the lower threaded ends of said levers being pivotally connected to the rocking frame 20 as hereinbefore described, but said levers in this construction are not provided with a sleeve and coiled spring. The cross bar is provided with rings or collars 31$^a$ and the arms 28 carry a cross strap 30 which, when the pole frame oscillates rearwards, is engaged by the stop 6 of the pivoted T-piece 5 which latter is secured on a cross pin 33 freely mounted in the integral bearing 32 of the pole frame 2.

The inner faces of the frame 2 are provided with integral projecting studs 35 which are adapted to contact against the back edges of the arms 28 and force same forwards causing the levers 7 to tilt or rotate the rocking frame and release same from the influence of the spring 24 when the trolley leaves the wire and the pole rises or swings forwards.

The pole frame is also formed with two legs or members having short inwardly projecting ends 34 which are adapted to bear against the front edges of the arm 28 to reset the rocking frame when the pole is pulled down to a horizontal position.

The principle underlying this invention and which briefly consists of the automatic release of the pole frame and trolley pole from the action of the spring when the trolley wheel leaves its wire is shown applied to a form of the appliance wherein two tension springs 43 are employed. In this construction the central guide rod spring 24 and guide rod 23 are dispensed with and the two coiled springs 43 are employed positioned parallel to, and on the inside of, two compression rods 38, the rearward movement of said connecting rods being limited by the recoil of the springs 43 and their forward travel also regulated or limited by the nuts 40 on their threaded front portions 41, these nuts acting as stops which butt up against the front apertured lugs or eyes 39$^a$ of pins 39 which are rotatably secured in openings in the side edges of the rocking frame 42 by split pins 42$^a$ which bear against their grooved or concaved ends. Another pair of transversely mounted pins 39 are similarly secured in the lateral extensions 50 of the pole frame 2. The front and rear pairs of pins 39 receive the front and rear ends 43$^a$ respectively of the springs 43, the rear pair having heads 39$^b$ which hold the eyes 38$^a$ of the rods 38 securely in position and enable the said rods to freely pivot about the pins.

The rotatable member 1 is provided with an integral longitudinally disposed tube or rod 46 which is adapted to be slidably adjusted in a sleeve 47 by a set screw or threaded bolt 48 which passes through the front face of the sleeve 47, and bears against the front end of the rod 46 and is secured in position by a nut 49. The said tube or bar 46 has ridges or keys formed on its surface to take into similar longitudinal recesses or keyways in the sleeve 47 and thus prevent these parts from rotating or turning. If desired the bar 46 can be made rectangular in cross section and adapted to take into a sleeve of similar cross section. The said sleeve 47 is provided with an integral upper transverse bearing 45 extending on both sides of the same and which bearing receives a pin 44 provided with end nuts 44$^a$ and about which pin the frame 20 is free to rotate or tilt when the levers 7 are forced downwards and which latter, in this form of construction, are positioned on the inside of the compression rods 38. The telescopic tube 46 and sleeve 47 are designed to enable the tension of the springs 43 to be adjusted, either to be further compressed or relaxed as the case may be.

The levers 7 and their parts are the same as those hereinbefore described and shown in Figs. 1 and 2 and are connected by the bridging strap 13. the cross piece 4 with the pivoted T-piece 5 and depending stop 5$^a$ and which latter is adapted to be engaged by the face 26$^b$ of the L-plate 26, the functions of all of which parts have been hereinbefore described.

The appliance as illustrated in Figs. 7 and 8 is shown in its normal or working condition, the trolley wheel being in engagement with the trolley wire (not shown) and is kept into such engagement by the tension of the springs 43. After the trolley wheel has accidentally disengaged itself from the trolley wire, the pole rises, and the pole frame swings forward and through the medium of the cross piece 4 which being integral with the pole frame arms describes an arc similar to that of the pole frame and bears against the nut 12 and thus the pole frame, cross piece and the levers move as one piece and the levers thus actuated tilt or turn the rocking frame about its pin or axis 45. The nuts 40 limit the forward slidable movement of the compression rods 38 and which nuts act as stops and perform the same function as the nuts 24ª on the central guide rod 23, and enable the rocking frame to pivot about its hinge pin 45 when the nuts 40 bear against the eye lugs 39ª and in which position the springs 43 become inoperative and thus the pole frame is released from their influence or tension and is free to oscillate or pivot rearwards.

If desired, more than one pair of springs can be employed such as a pair on each side of and between the connecting rods and levers.

The appliance illustrated in Figs. 9 and 10 is practically the same as that just described except that the pole frame and independent arms 28 illustrated in Figs. 4, 5 and 6 are employed in conjunction with the tension springs 43. The action of the said appliance is similar in all respects to that herein described and the rocking frame 20 is re-set or re-adjusted in exactly the same manner as that hereinbefore described and as illustrated in Figs. 4, 5, 6, 7 and 8 of the accompanying drawings.

Having now described my invention what I claim as new and desire to secure by Letters Patent is:

1. A trolley pole safety appliance for electric trams and the like, consisting in combination with a trolley pole, of an upright rotatable member, an integral socket piece, a guide rod supported by said socket piece, a coiled spring, sleeve and nuts mounted on said guide rod, a rocking frame pivoted to and adapted to partially rotate about said sleeve, an upper bridge formed integral with said rocking frame and provided with stops to limit its forward rotation, a pole frame pivoted to said rotatable member, a cross piece carried by the said pole frame, two spring controlled levers pivoted to the rocking frame and slidably mounted in the eyes of the said cross piece, two draw bars pivotally connected to the pole frame and slidably mounted in integral bearings of said rocking frame, means for the automatic release of the pole and pole frame from the influence of the guide rod spring, to allow the pole to descend beneath the overhead wire system after the trolley wheel has left the trolley wire, means for preventing the pole from vibrating, and means for conveniently re-setting the rocking frame to bring the pole and its trolley wheel again under the influence of the guide rod spring.

2. In a trolley pole safety appliance for electric trams and the like, an oscillating pole frame connected to a rocking frame by two spring controlled levers and by two draw bars.

3. A safety appliance for electric trams and the like comprising in combination, a base, an upright rotatable member supported thereon, an integral socket piece secured to the rotatable member, a trolley frame, a guide rod projecting from the socket piece and provided with a coiled spring and a sleeve, the front of the guide rod being threaded and provided with a nut, a rotatable member pivoted on said sleeve comprising a bridge piece having abutments to limit its movement, a connecting rod pivoted to the trolley frame and having pivotal connection with the sleeve, a pair of arms formed integral with the pole frame and adapted to support a cross piece, a pair of levers pivoted to the rotatable member and extending through the cross piece, each of said levers being provided with abutments and springs, a latch member arranged to co-operate with the cross piece to prevent vibration of the parts, and an adjustable member arranged to trip the latch member.

4. A safety appliance for electric trams and the like comprising in combination, a base, an upright rotatable member supported thereon, an integral socket piece secured to the rotatable member, a trolley frame, a guide rod projecting from the socket piece and provided with a coiled spring and a sleeve, a rotatable member pivoted on said sleeve comprising a bridge piece having abutments to limit its movement, a connecting rod pivoted to the trolley frame and having pivotal connection with the sleeve, a pair of arms formed integral with the pole frame and adapted to support a cross piece, a pair of levers pivoted to the rotatable member and extending through the cross piece, each of said levers being provided with abutments and springs, a latch member arranged to co-operate with the cross piece to prevent vibration of the parts, and an adjustable member arranged to trip the latch member.

5. A safety appliance for electric trams and the like comprising in combination, a base, an upright rotatable member supported thereon, an integral socket piece secured to the rotatable member, a trolley frame, a guide rod projecting from the socket piece and provided with a coiled spring and a sleeve the front of the guide rod being threaded and provided with a nut, a rotatable member pivoted on said sleeve comprising a bridge piece having abutments to limit its movement, a connecting rod pivoted to the trolley frame and having pivotal connection with the sleeve, a pair of arms adapted to support a cross piece, a pair of levers pivoted to the rotatable member and extending through the cross piece, each of said levers being provided with abutments and springs, a latch member arranged to co-operate with the cross piece to prevent vibration of the parts, and an adjustable member arranged to trip the latch member.

6. A safety appliance for electric trams and the like comprising in combination, a base, an upright rotatable member supported thereon, an integral socket piece secured to the rotatable member, a trolley frame, a guide rod projecting from the socket piece and provided with a coiled spring and a sleeve, a rotatable member pivoted on said sleeve, a connecting rod pivoted to the trolley frame and having pivotal connection with the sleeve, a pair of arms adapted to support a cross piece, a pair of levers pivoted to the rotatable member and extending through the cross piece, each of said levers being provided with abutments and springs, a latch member arranged to co-operate with the cross piece to prevent vibration of the parts, and an adjustable member arranged to trip the latch member.

7. A safety appliance for electric trams and the like comprising in combination, a base, an upright rotatable member supported thereon, an integral socket piece secured to the rotatable member, a trolley frame, a guide rod projecting from the socket piece and provided with a coiled spring and a sleeve, the front of the guide rod being threaded and provided with a nut, a rotatable member pivoted on said sleeve comprising a bridge piece having abutments to limit its movement, a connecting rod pivoted to the trolley frame and having pivotal connection with the sleeve, a pair of arms formed integral with the pole frame and adapted to support a cross piece, and a pair of levers pivoted to the rotatable member and extending through the cross piece, each of said levers being provided with abutments and springs.

8. A safety appliance for electric trams and the like comprising in combination, a base, an upright rotatable member supported thereon, an integral socket piece secured to the rotatable member, a trolley frame, a guide rod projecting from the socket piece and provided with a coiled spring and a sleeve, a rotatable member pivoted on said sleeve, a connecting rod pivoted to the trolley frame and having pivotal connection with the sleeve, a pair of arms formed integral with the pole frame and adapted to support a cross piece, and a pair of levers pivoted to the rotatable member and extending through the cross piece, each of said levers being provided with abutments and springs.

9. A trolley pole safety appliance comprising an oscillating frame supporting a trolley pole with a trolley wheel mounted on its upper end and provided with two upper apertured integral arms which are adapted to receive and support a cross piece, a rocking frame carrying two spring controlled levers, the upper ends of which are slidably mounted in the eyes of said cross piece, a T shaped arm pivotally mounted on said cross piece and provided with a notched under surface and an integral depending plate to provide a stop, a transversely mounted bridging strap rigidly secured to said levers and adapted to be engaged by the notched end of the said T shaped arm after the trolley wheel has left its wire and the pole frame pivots rearwardly, said stop being adapted to disengage itself from the bridging strap when the pole has been pulled down to a horizontal position to latch the rocking frame and the pole frame is allowed to pivot forwardly.

10. A trolley pole safety appliance comprising a rotatable member adapted to pivotally support an oscillating pole frame and provided with a front integral socket piece for the reception of a horizontally projecting guide rod, an upper bearing cast integral with said socket piece, a slotted L plate formed with a rear upstanding face and adjustably secured in position by a set screw, and inner transverse bearings of said rotatable member to support a cross spindle which carries the said oscillating pole frame.

11. A trolley pole safety appliance for electric trams and the like comprising a sleeve mounted upon a guide rod carrying a coiled spring, two hollow internally threaded side lugs cast integral with said sleeve for the reception of set screws, a U-shaped rocking frame the arms of which are adapted to pivot on said set screws, and two side hollow lugs cast integral with the rocking frame arms, and adapted to take threaded pins for the reception of the front eyes of two spring controlled levers, which, when the trolley wheel leaves its wire, are thrust downwardly and impart a rearward rotary movement to the rocking frame.

12. A trolley pole safety appliance comprising a spring controlled trolley connected to a rocking frame by two levers, a pair of draw bars, a coiled spring, and a slidable sleeve, said rocking frame being adapted to release itself from the action of said spring when the trolley wheel leaves the trolley wire.

13. A trolley pole safety appliance for electric trams and the like comprising a rocking frame pivoted to a sleeve slidably mounted on a guide rod provided with end stops, and an upper integral bridge cast with said rocking frame and having stops to limit the forward rotation of said rocking frame.

14. A trolley pole safety appliance for electric trams and the like comprising an oscillating pole frame connected to a pivoted rocking frame, a pair of spring controlled levers for connecting said pole frame to said rocking frame, each lever having a sleeve and a tubular casing positioned thereon, said casing being held in position by a rear nut, a coiled spring on each of said sleeves, a bridge strap rigidly connected to said levers, and a cross piece supported by said pole frame having eyes to slidably receive the upper portions of said levers.

15. A trolley pole safety appliance for electric trams and the like comprising a rotatable member having an integral socket piece to support a guide rod, integral bearings to support a transverse spindle, an oscillating pole frame adapted to oscillate with said spindle, integral bearings formed on the side cheeks of said pole frame and adapted to receive the ends of two draw bars, and a rocking frame adapted to slidably receive the front ends of said draw bars.

16. A trolley pole safety appliance for electric trams comprising an oscillating pole frame connected to a pivoted rocking frame by spring controlled levers and draw bars and wherein the pivoting points of the rocking frame are above the axis of the rocking frame bearings which slidably receive the front ends of the draw bars and so prevent the accidental rotation of said rocking frame.

17. A trolley pole safety appliance for electric trams and the like comprising a sleeve slidably mounted on a guide rod carried by a rotatable member, means for reciprocating said sleeve to compress its spring and reset the rocking frame, permitting said spring to recoil and force said sleeve towards the end of said guide rod.

18. A trolley pole safety appliance comprising a pivoted pole frame carrying the lower end of a trolley pole and connected to a pivoted rocking frame through the medium of a coiled spring, slidable draw bars, and spring controlled levers substantially as described.

19. A trolley pole safety appliance for electric trams and the like comprising an oscillating pole frame connected to a rocking frame by two spring controlled levers and draw bars, and means for compressing a recoiling spring to reset said rocking frame when the pole frame is swung rearwardly and the pole brought to a horizontal position.

20. A trolley pole safety appliance comprising a guide rod carrying a coiled spring and a slidably mounted sleeve which pivotally supports a rocking frame, said spring adapted to expand and force the sleeve forwardly on said guide rod, and to allow the rocking frame to be rotated rearwardly and be freed from the influence of said coiled spring after the trolley wheel has become disengaged from the trolley wire.

21. A trolley pole safety appliance for electric trams, comprising an oscillating pole frame connected to a pivoted rocking frame by a spring-controlled lever and draw bar, and wherein the pivoting points of the rocking frame are above the axis of the rocking frame bearing which receives the end of the draw bar.

In testimony whereof I have signed my name to this specification in the presence of two subscribing witnesses.

PERCY MARKHAM DE COURCY IRELAND.

Witnesses:
BEDLINGTON FEOLIC RODYCOMB,
LESLIE LAWTON BEAR.